(12) United States Patent
Jensen et al.

(10) Patent No.: US 7,617,324 B2
(45) Date of Patent: *Nov. 10, 2009

(54) PROTOCOL METHOD FOR PROVISIONING SERVICES

(75) Inventors: Peter Strarup Jensen, Mountain View, CA (US); Pavel S. Veselov, San Jose, CA (US); Dianna L. Decristo, Venice, CA (US); Darryl J. Mocek, San Jose, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 10/600,281

(22) Filed: Jun. 20, 2003

(65) Prior Publication Data

US 2004/0260774 A1    Dec. 23, 2004

(51) Int. Cl.
*G06F 15/16* (2006.01)

(52) U.S. Cl. .............. 709/230; 379/201.01; 379/221.08

(58) Field of Classification Search ............... 709/206, 709/224, 228, 230, 223, 203, 229, 248, 204, 709/201; 455/418; 370/352, 465; 379/221, 379/201.01
See application file for complete search history.

(56) References Cited

U.S. PATENT DOCUMENTS

| | | | | |
|---|---|---|---|---|
| 5,915,008 | A * | 6/1999 | Dulman .................. | 379/221.08 |
| 6,341,316 | B1 * | 1/2002 | Kloba et al. ................. | 709/248 |
| 6,704,768 | B1 * | 3/2004 | Zombek et al. ............. | 709/201 |
| 6,985,955 | B2 * | 1/2006 | Gullotta et al. ............. | 709/229 |
| 7,219,124 | B2 * | 5/2007 | Cerami et al. ................ | 709/203 |
| 7,506,059 | B2 * | 3/2009 | Mulligan .................... | 709/230 |
| 2002/0013827 | A1 | 1/2002 | Edstrom et al. ............. | 709/219 |
| 2002/0101879 | A1 * | 8/2002 | Bouret et al. ................ | 370/465 |
| 2002/0131404 | A1 * | 9/2002 | Mehta et al. ................. | 370/352 |
| 2003/0084177 | A1 * | 5/2003 | Mulligan .................... | 709/230 |
| 2003/0133554 | A1 * | 7/2003 | Nykanen et al. ........ | 379/201.01 |
| 2004/0003039 | A1 * | 1/2004 | Humphrey et al. .......... | 709/204 |
| 2004/0010542 | A1 * | 1/2004 | Kumar et al. ................ | 709/203 |

(Continued)

FOREIGN PATENT DOCUMENTS

WO    WO 01/86423 A2    11/2001

(Continued)

OTHER PUBLICATIONS

Larson "An Overview of JSR 124: J2EE Client Provisioning", XP-002371052, Mar. 7, 2006, © Sun Microsystems, Inc.

(Continued)

*Primary Examiner*—Dustin Nguyen
(74) *Attorney, Agent, or Firm*—Martine Pennilla & Gencarella, LLP

(57) ABSTRACT

An invention is disclosed for a computer protocol that facilitates provisioning services to client devices. The computer protocol includes discovery transactions that allow a client device to retrieve information regarding services available to the client device from a provisioning server. A service comprises a plurality of content files capable of being installed on the client device. The computer protocol also includes subscription transactions that allow the client device to manage content in service directories. A service directory comprises a plurality of services. Further included in the computer protocol are delivery transactions that allow the client device to downloading of data related to services.

20 Claims, 6 Drawing Sheets

U.S. PATENT DOCUMENTS

| | | | |
|---|---|---|---|
| 2004/0110497 A1* | 6/2004 | Little | 455/418 |
| 2004/0128375 A1* | 7/2004 | Rockwell | 709/223 |
| 2004/0153547 A1* | 8/2004 | Trossen | 709/228 |
| 2004/0260774 A1* | 12/2004 | Jensen et al. | 709/206 |
| 2005/0027851 A1* | 2/2005 | McKeown et al. | 709/224 |
| 2006/0235925 A1* | 10/2006 | Rossotto et al. | 709/203 |

FOREIGN PATENT DOCUMENTS

WO    WO 02/44892 A2    6/2002

OTHER PUBLICATIONS

Unknown, *White Paper-InfiniteMAP™*, Ellipsus Systems, XP-002266188, Feb. 12, 2001, www.ellipsus.com.

\* cited by examiner

PROTOCOL METHOD FOR PROVISIONING SERVICES

CROSS REFERENCE TO RELATED APPLICATIONS

This application is related to U.S patent application Ser. No. 10/600,119, filed Jun. 20, 2003, now U.S. Pat. No. 7,444, 386, and entitled "Application Programming Interface for Provisioning Services," which is incorporated herein by reference.

BACKGROUND OF THE INVENTION

1. Field of the Invention

This invention relates generally to computer networking, and more particularly to a protocol for provisioning services using limited defined atomic units.

2. Description of the Related Art

Current mobile computing environments allow computer users great variety in digital services, which can vary from device to device depending on the type of client device used and the needs of the user. Typically, mobile client devices obtain digital services via a provisioning server as illustrated in FIG. 1.

FIG. 1 is an illustration showing a prior art provisioning framework 100. The provisioning framework 100 includes a plurality of client devices 102a-102c in digital communication with a provisioning server 104. The client devices 102a-102c can be any type of digital computing device. For example, as shown in FIG. 1, exemplary client devices include telematics client devices 102a in automobiles, mobile phones 102b, and a desktop computers 102c.

The provisioning server 104 is a network resource from which the client devices 102a-102c can obtain access to new digital services and update existing digital services. As illustrated in FIG. 1, one approach to implementing the provisioning server 104 is an adapter/application model. In this approach, the provisioning server 104 includes a plurality of provisioning adapter modules 106a-106c, which facilitate communication between the client devices 102a-102c and a provisioning application 108. The provisioning application 108 generally is a generic and more device independent application that includes the business logic for the provisioning service.

Each provisioning adapter 106a-106c is designed to communicate with a specific type of client device, and "translate" the client device communication into a form understandable by the provisioning application 108. For example, provisioning adapter 106a can be designed to communicate with the telematics client device 102a. In this case, the provisioning adapter 106a receives commands from the telematics client device 102a and translates the received commands into commands acceptable by the provisioning application 108. Similarly, the provisioning adapter 106b receives and translates commands from the mobile phone client device 102b, and the provisioning adapter 106c receives and translates commands from the desktop computer client device 102c.

As can appreciated, each provisioning adapter 106a-106c also facilitates command and content delivery from the provisioning application 108 to each client device 102a-102c. That is, the provisioning adapter 106a receives commands from the provisioning application 108 and translates the received commands into commands acceptable by the telematics client device 102a. Similarly, the provisioning adapter 106b receives and translates commands from provisioning application 108 and delivers them to the mobile phone client device 102b, and the provisioning adapter 106c receives and translates commands for delivery to the desktop computer client device 102c.

Generally, the provision server 104 keeps track of users using a database 110, which stores user information, service content, and other data usable by the provisioning application 108. In this manner, different services can be provided to different users based on their user information. For example, a particular user can pay for a service and a record of payment can be stored in the user information for that particular user. Thereafter, the user can access the services and other content bought.

Unfortunately, prior art provisioning servers 104 do not have a standard mechanism for communication between the client devices 102a-102c and the provisioning applications 108. Hence, different adapters 106a-106c can require different interface programming. Moreover, each adapter 106a-106c can implement commands to the provisioning application 108 in different manners. Thus, a prior art provisioning application 108 executed on a prior art provisioning server 104 generally is designed to operate with specific provisioning adapters 106a-106c that are designed along with the provisioning application 108. As a result, new provisioning adapters generally cannot be added to the provisioning server 104 without altering the provisioning application 108. That is, the provisioning application 108 generally must be altered if a further provisioning adapter is added at a later date to facilitate communication with another client device.

In view of the foregoing, there is a need for a method for provisioning services that provides a standard communication mechanism for provisioning applications and client devices. The method should provide provisioning services using limited defined atomic units that can be utilized for a wide variety of applications and client devices.

SUMMARY OF THE INVENTION

Broadly speaking, the present invention fills these needs by providing a standard mechanism for communication between client devices and a provisioning server. In one embodiment, a computer protocol for provisioning services is disclosed. The computer protocol includes discovery transactions that allow a client device to retrieve information regarding services available to the client device from a provisioning server. As will be described in greater detail below, a service comprises a plurality of content files capable of being installed on the client device. The computer protocol also includes subscription transactions that allow the client device to manage content in service directories. A service directory comprises a plurality of services, as will be discussed in greater detail subsequently. Further included in the computer protocol are delivery transactions that allow the client device to downloading of data related to services. In one aspect, the discovery transactions can include a service discovery transaction that allows the client device to obtain information regarding a particular service. The discovery transactions can also include a service directory discovery transaction that allows the client device to obtain information regarding a particular service directory.

A method for provisioning services between a client device and a provisioning server is disclosed in an additional embodiment of the present invention. The method includes providing discovery transactions that allow the client device to retrieve information regarding services available to the client device from a provisioning server. In addition, subscription transactions are afforded that allow the client device to manage content in service directories, and delivery transactions are provided that allow the client device to downloading of data related to services. In one aspect, the subscription transactions can include a service subscription transaction that allows a service to be added to a service directory, and an unsubscribe transaction that allows a service to be removed from a service directory.

A system for provisioning services is disclosed in a further embodiment of the present invention. The system includes a provisioning server and a client device, which is in communication with the provisioning server via a provisioning protocol. As above, the provisioning protocol includes discovery transactions that allow a client device to retrieve information regarding services available to the client device from a provisioning server. The provisioning protocol also includes subscription transactions that allow the client device to manage content in service directories, and delivery transactions that allow the client device to downloading of data related to services. In one aspect, the delivery transactions can include an update transaction that allows the client device to obtain a provisioning update comprising a list of services that should be installed on the client device. The delivery transactions can also include a notification transaction that allows the provisioning server to request the client device to perform an update transaction. Further, the delivery transactions can include a delivery transaction that allows the client device to download data related to a service. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a protocol for provisioning services. Generally, embodiments of the present invention provide a protocol for provisioning services that provides a standard mechanism for communication between client devices and a provisioning server. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
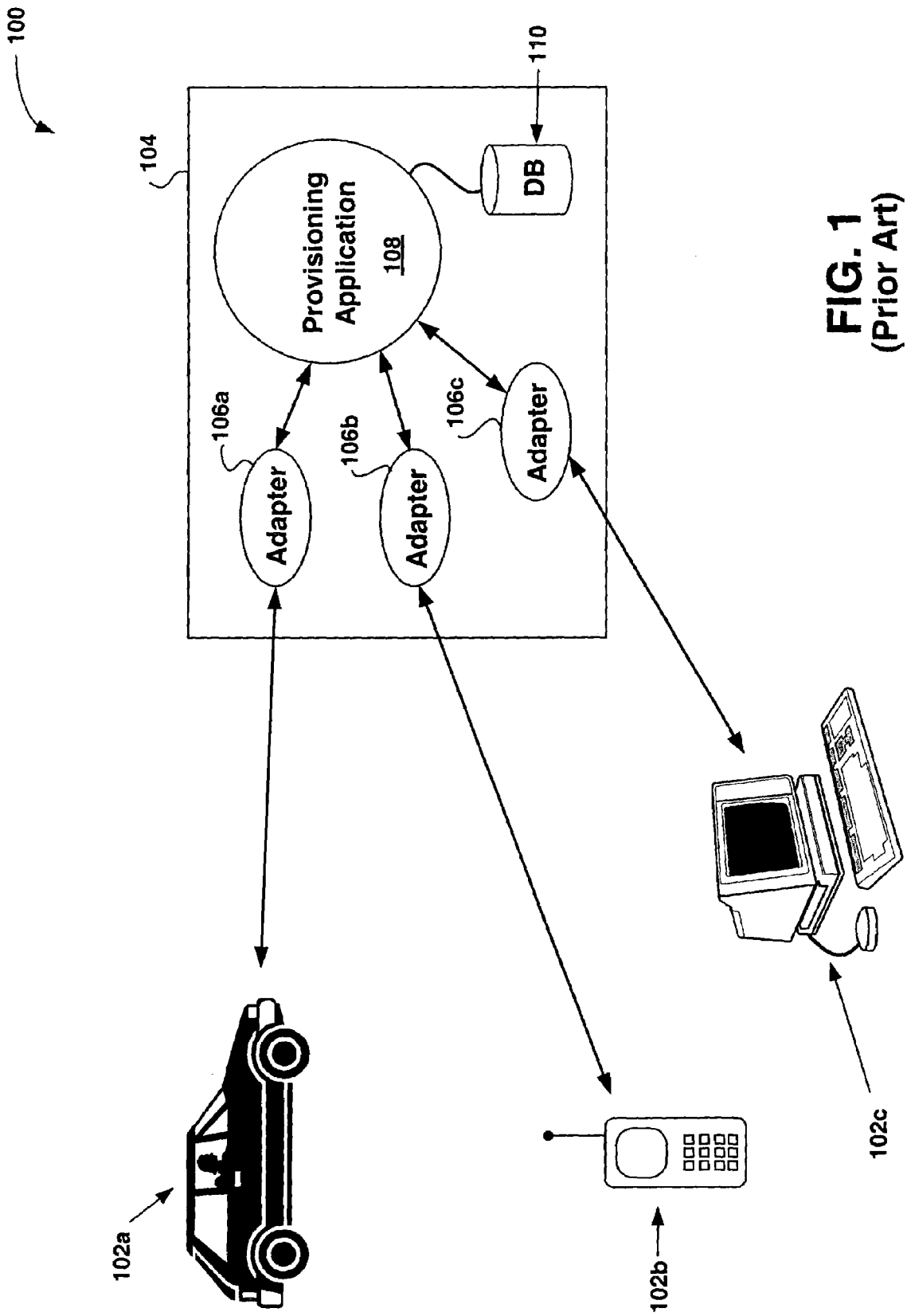
FIG. 1 is an illustration showing a prior art provisioning framework.
Figure 2:
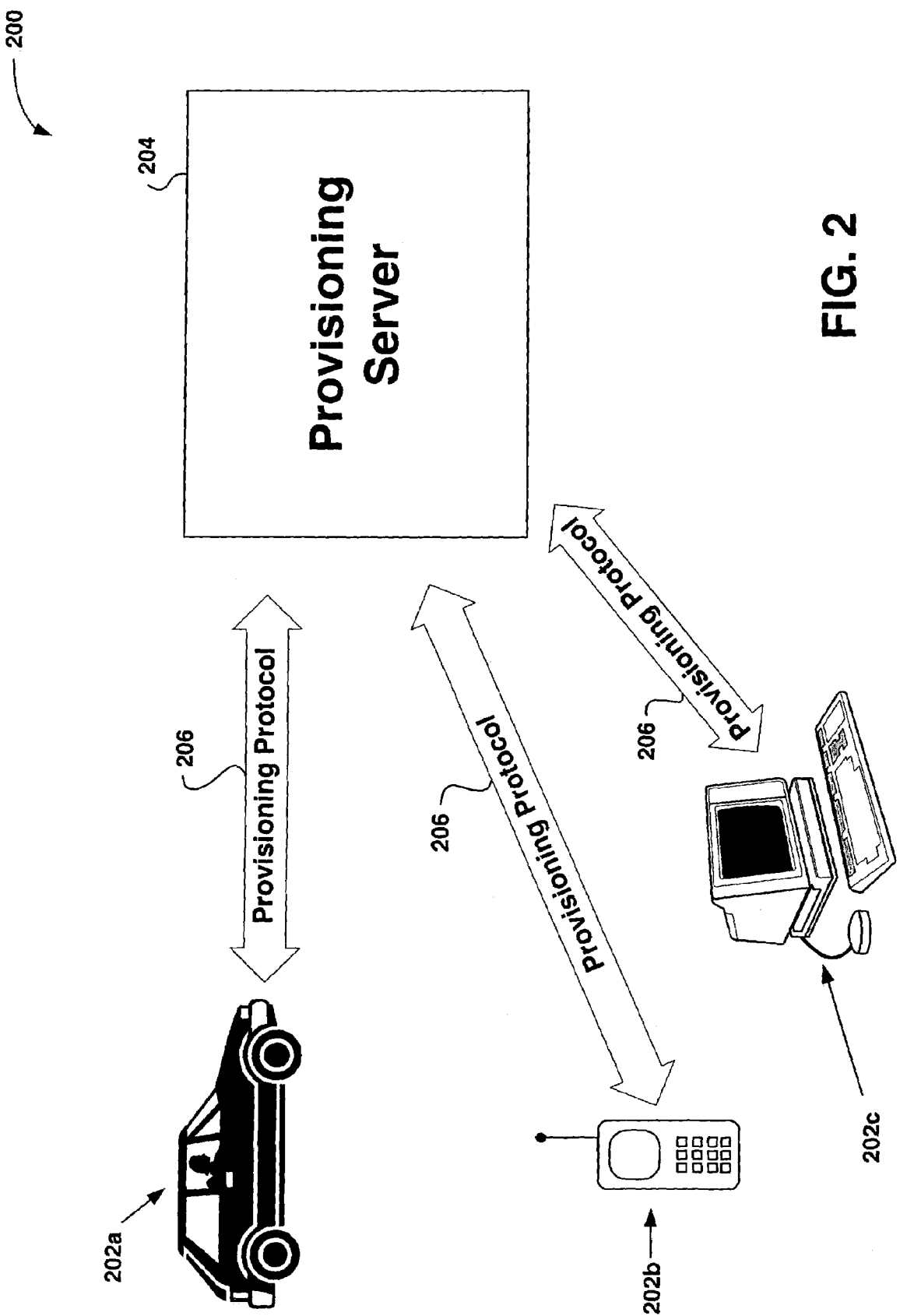
FIG. 2 is an illustration showing a provisioning system using a provisioning protocol for communication between client devices and the provisioning server, in accordance with an embodiment of the present invention.

FIG. 1 was described in terms of the prior art. FIG. 2 is an illustration showing a provisioning system 200 using a provisioning protocol for communication between client devices and the provisioning server, in accordance with an embodiment of the present invention. The provisioning system 200 includes a plurality of client devices 202a-202c in digital communication with a provisioning server 204 via a provisioning protocol 206. The client devices 202a-202c can be any type of digital computing device, such as telematics client devices 202a in automobiles, mobile phones 202b, a desktop computers 202c, or any other type of client device capable of communicating with the provisioning server 204. Each client device 202a-202c is capable of establishing a network connection, which can be a physical connection or wireless connection, to the provisioning server 204. In addition, each client device 202a-202c may be intermittently ON or OFF, and intermittently connected to the network when the client device 202a-202c is ON.

Each client device 202a-202c provides an application execution environment. For example, an application execution environment can include a microprocessor, a Connected Limited Device Configuration (CLDC) compliant Java environment, a Mobile Information Device Profile (MIDP), and an Application Management System (ASM). Another exemplary application execution environment can include a microprocessor, an operating system, a Connected Device Configuration (CDC) compliant Java environment with the personal foundation profiles, and an Open Service Gateway Initiative (OSGi) compliant application management system. In one embodiment, as part of the client devices 202a-202c application management system, each client device 202a-202c executes a Provisioning Manager (PM). One logical part of the PM is a Client Provisioning Protocol Manager (CPPM), which is responsible for communication with a Provisioning Server Protocol Manager (PSPM), which is executed on the provisioning server 204.

Similar to above, the provisioning server 204 is a network resource from which the client devices 202a-202c can obtain access to new digital services and update existing digital services. The provisioning server 204 is a highly available network resource that can be embodied on a single computer or on a plurality of computers. For example, to increase availability, scalability, and manageability, the provisioning server 204 can be embodied on a collection of tightly coupled computers. However, from the point of view of the client devices 202a-202c, the provisioning server 204 generally appears as a single logical entity.

As will be described in greater detail subsequently, the provisioning protocol 206 of the embodiments of the present invention provides a plurality of transactions that can be utilized to implement deployment specific provisioning models of various levels of complexity, and which satisfies the needs of different underlying business models. In one embodiment, the provisioning protocol 206 provides discovery, subscription, and delivery functionality for the client devices 202a-202c. Broadly speaking, the provisioning protocol 206 provides discovery functionality allowing a client device 202a-202c to discover services and contents that are available to the particular client device. Subscription functionality is provided by allowing a client device 202a-202c to manage the content of services directories, described in greater detail below. The provisioning protocol's 206 delivery functionality allows a client device 202a-202c to receive content that has become available to the client device or remove content that should be removed from the device. In addition, delivery functionality allows a client device 202a-202c to download available content.

As mentioned above, the provisioning server 204 provides services and content to client devices 202a-202c. In the following description, a service is defined as a collection of one or more downloadable content files that are installed on a client device 202a-202c in order to provide the user of the client device with a particular functionality. Services can also be utilized to customize the user experience of existing functionality present on the client device. A content file can be an executable file, media files, property files, archive files, or any other file that may be required to provide a particular functionality on a client device. For example, exemplary content files can be executable Java byte code files, sound files, a video files, and image files. Services provide a product-level view of content that is usable by client device users, while individual content files represent a resource-level view that may or may not be exposed to the client device user.

In addition to individual services, embodiments of the present invention also process service directories. A service directory is an identifiable collection of services. A service directory also can be associated with a collection of nested service directories. In use, service directories can be defined a plurality of administrative purposes. For example, a service directory can be utilized for presentation and navigation of service categories, and tracking of subscriptions and service deployment. Generally, the provisioning server 204 manages the content of a service directory. For example, the provisioning server 204 can manipulate a service directory as a result of a dynamic calculation or using a database representation.

A bundle is defined as a physical downloadable component. Bundles are parts of services, and are generally used during delivery. When a service is being delivered to a client device, all the required bundles corresponding to that service are downloaded to the client device. In one embodiment, a bundle includes two parts, a descriptor file and an actual content file. Generally these parts may be downloaded separately, however, the descriptive information for each bundle in a service can also be aggregated in the service description (service object). A bundle can also include a URL property, which is utilized for downloading.

In the following description, Extensible Markup Language (XML) constructions will be utilized to describe the provisioning protocol of the embodiments of the present invention. However, it should be noted that the provision provisioning protocol of the embodiments of the present invention can be implemented using different encoding techniques, as will be apparent to those skilled in the art after a careful reading of the present disclosure. XML is an open standard for describing data and is often used for defining data elements on a Web page and business-to-business documents. XML uses a similar tag structure as HTML. However, whereas HTML defines how elements are displayed, XML defines what those elements contain. Further, HTML uses predefined tags, while XML allows tags to be defined by the developer of the page. Thus, virtually any data items, such as test suites and individual tests, can be identified, allowing XML documents to function like database records.

The human-readable XML tags provide a simple data format, which is defined in a document type definition (DTD) format that defines content type as well as name. Thus, unlike HTML, which uses a rather loose coding style and which is tolerant of coding errors, XML pages are "well formed," which means they comply with rigid rules.

An XML document primarily comprises a strictly nested hierarchy of elements with a single root. Elements can contain character data, child elements, or a mixture of both. In addition, they can have attributes. Child character data and child elements are strictly ordered, while attributes are not. The names of the elements and attributes and their order in the hierarchy (among other things) form the XML markup language used by the document, also known as the "validity" of the document. As mentioned above, this language can be defined by the document author or it can be inferred from the document's structure.

In the following description the tag and attribute names are chosen to better explain the reason for them rather than proposing a particular naming schema. Further, nesting that is natural to XML is not imposed for implementation, but assists in teaching how data belongs to any other data, and increases the readability of the examples.

In one embodiment, certain information is transmitted to identify the client device and unify the protocol. In addition, information is transmitted to identify the session, protocol version, and protocol type. Hence, one embodiment of the present invention utilizes a nested list of elements the client device 202a-202c will transmit to the provisioning server 204 within each request, as illustrated in Table 1. In the following description, quoted fields represent values of corresponding attributes that are implementation dependent.

TABLE 1

<provisioning version = "protocol version">
  <client id = "client id" />
  <user id = "user id" password = "user password">
  <session id = "session id">
    <!-- contents of the session -->
  </session>
</provisioning>

Since the provisioning server 204 generally does not need to specify which client device the reply or request is sent to, the provisioning server 204 can omit the <client> tag. In its place, the provisioning server 204 can return a generic <status> tag that indicates the success of the operation, as illustrated below in Table 2.

TABLE 2

<provisioning version = "protocol version">
  <session id = "session id">
  <status code = "implementation specific status code"/>
    <!-- contents of the session -->
  </session>
</provisioning>

Figure 3:
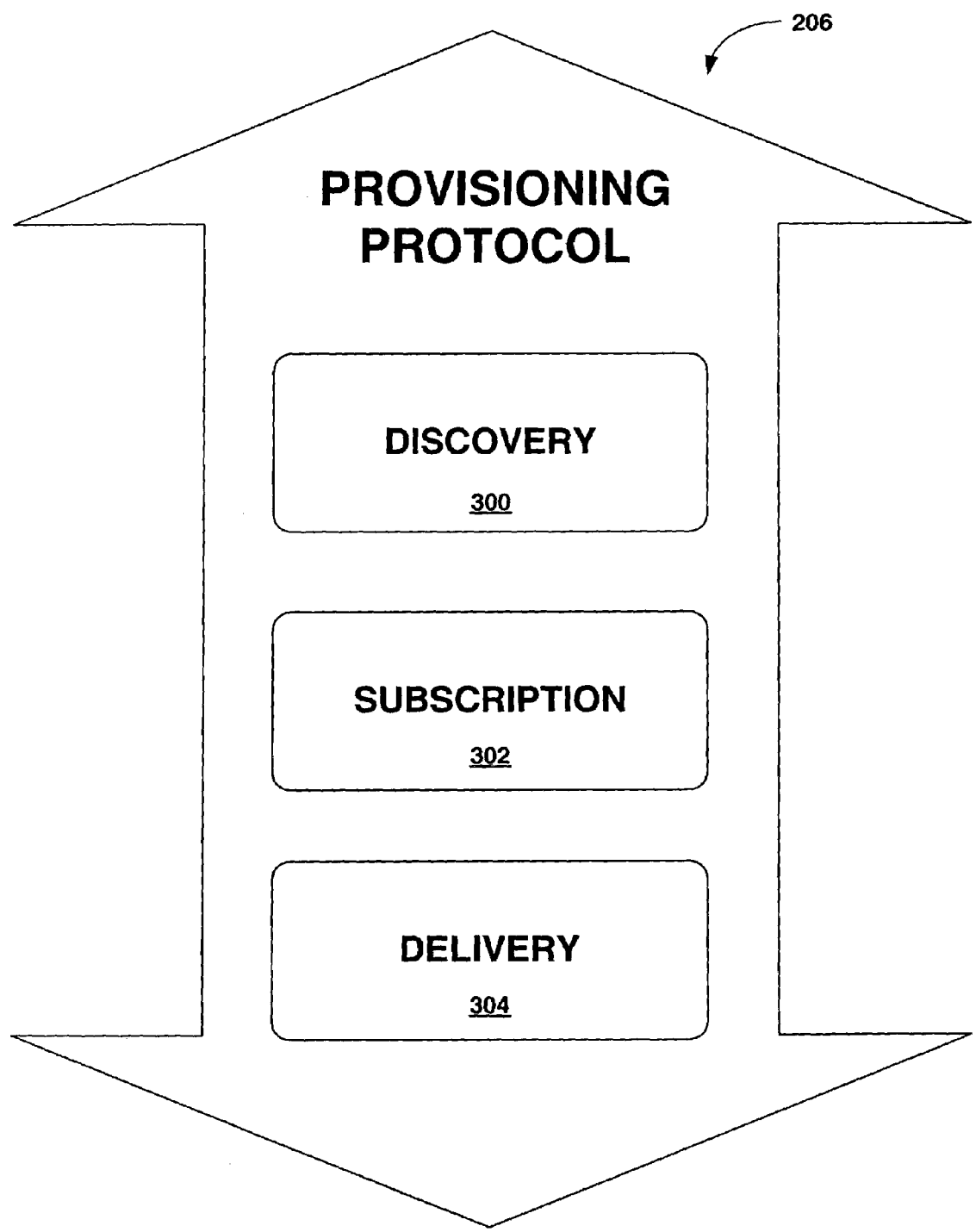
FIG. 3 is a block diagram illustrating the logical components of a provisioning protocol, in accordance with an embodiment of the present invention.

FIG. 3 is a block diagram illustrating the logical components of a provisioning protocol 206, in accordance with an embodiment of the present invention. As shown in FIG. 3, the provisioning protocol 206 provides discovery transactions 300, subscription transactions 302, and delivery transactions 304. The provisioning protocol 206 defines the interactions between the client devices and the provisioning server.

The discovery transactions 300 are used by a client device to retrieve information about services available to the client device, based on available contextual information. It should be noted that discovery transactions 300 can be utilized to retrieve information regarding services available to client devices that are different from the client device used to perform discovery. Subscription transactions 302 are utilized to manage the content of service directories. The name subscription refers to the fact that within the confines of most provisioning models these transactions are most commonly used to manipulate the content of a service directory modeling the set of services that have been subscribed to a particular client device. Delivery transactions 304 are used to discover content files that need to be either installed or removed from a client device. In addition, delivery transactions 304 can also be used to obtain download identifiers for content files. In one embodiment, the above transactions are initiated by a client device and comprise one request and one reply. Typically, a transaction is committed by the client device upon receipt of the reply and by the provisioning server upon sending the reply.

Figure 4:
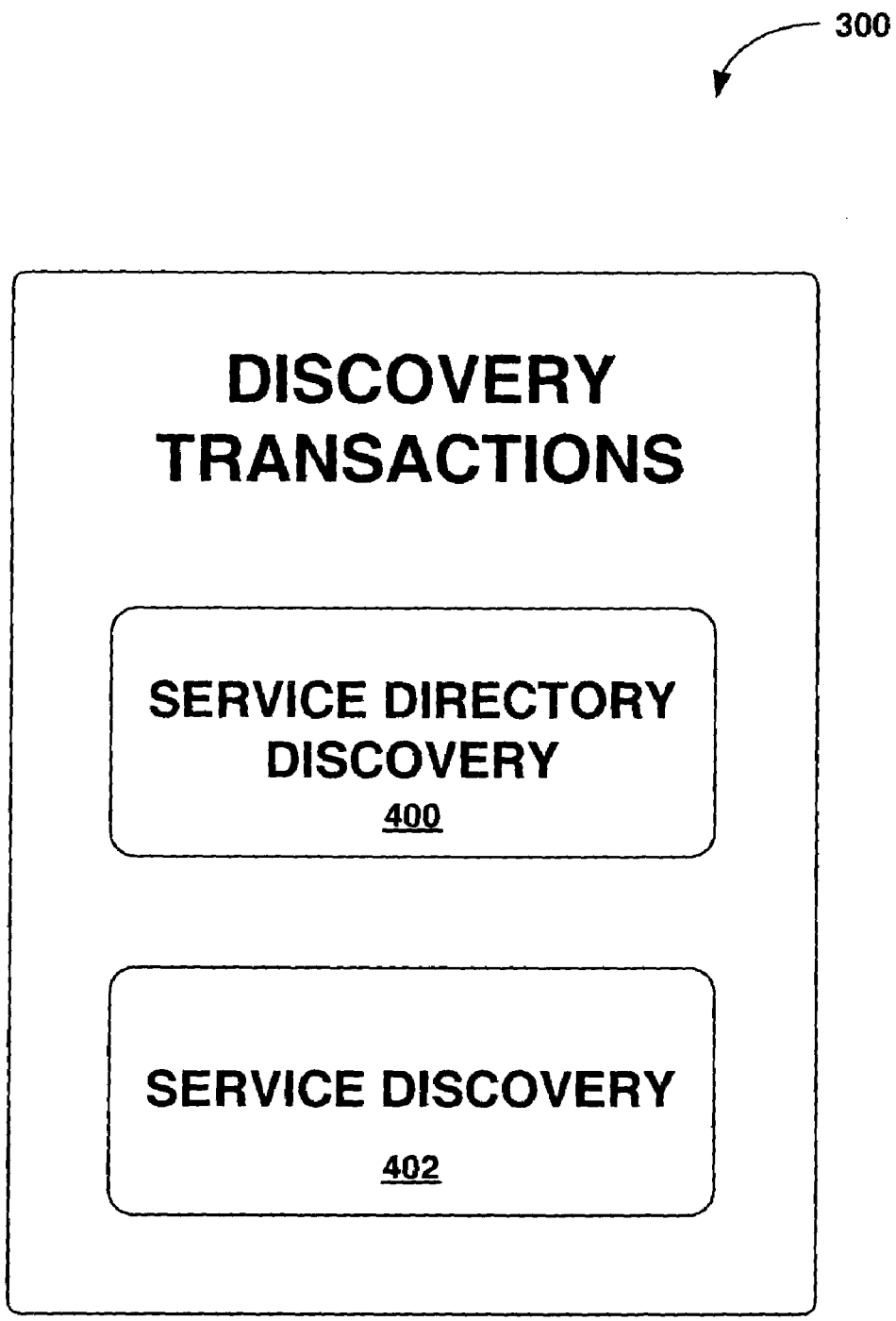
FIG. 4 is a block diagram showing exemplary discovery transactions, in accordance with an embodiment of the present invention.

FIG. 4 is a block diagram showing exemplary discovery transactions 300, in accordance with an embodiment of the present invention. The discovery transactions 300 provide capabilities to discover certain services or service directories. In one embodiment, the provisioning server includes client device information for each client device it services. The client device information for each client device can have three special service directories assigned to it, namely, an available services directory, a deployed services directory, and a subscribed services directory. The available services directory lists all the services currently available to the particular client device. The deployed services directory lists all the services that are currently deployed or delivered to the particular client device, and the subscribed services directory lists all the services currently subscribed to by the particular client device. To provide information on these services and service directories, embodiments of the present invention provide two discovery transactions, namely, a service directory discovery transaction 400 and a service discovery transaction 402.

The service directory discovery transaction 400 facilitates service directory discovery requests. In use, a client device makes a call to the provisioning server requesting information about a service directory matching particular search criteria. In reply, the provisioning application provides information about a matching service directory (or an error) to the requesting client device. The service discovery transaction 402 facilitates service discovery requests. In use, a client device makes a call to the provisioning server requesting information about a service matching particular search criteria. In reply, the provisioning server provides information about a matching service (or an error) to the requesting client device.

In one embodiment, the client device can query about dynamic service directories, that is, service directories whose contents are only known at the time of processing the discovery request. Each directory or service request returns a list of information the provisioning server wants the client device to know about the requested service or service directory. In addition, embodiments of the present invention allow the client device to restrict the granularity of the reply, for example, to save data bandwidth or to strictly define the list of properties the client device needs to discover. Table 3 below illustrates an exemplary discover request, in accordance with an embodiment of the present invention.

TABLE 3

```
<discover type = "service or directory" object =
"service or directory id or query">
    <granularity = "define list of properties or 'custom'" >
        <!-- the following 'property' tags can be utilized when
            granularity is set to custom.
        -->
        <property name = "the name of property the client device wants"/>
        <property name = " ... "/>
        <restriction rule = "implementation specific restriction"/>
```

TABLE 3-continued

```
        <restriction rule = " ... "/>
    </granularity>
</discover>
```

The exemplary request illustrated in Table 3 is nested into the session block described above with respect to Table 1. In one embodiment, one of the granularity restrictions or requirements can be nesting restrictions if the service directory is discovered defining whether or not nesting is requested and what nesting level is desired.

Unlike the request illustrated in Table 3, the reply from the provisioning server varies depending on whether the request is to discover a service or a service directory. Table 4 below illustrates the reply for a service discovery request.

TABLE 4

```
<discover type = "service" object = "service id or query">
    <service id = "unique identifier of service">
        <name = "service name"/>
        <version = "service version"/>
        <properties>
            <key = "property name/key" value = "property value"/>
            <!-- more key/value pairs can follow -->
        </properties>
    </service>
</discover>
```

In the example of Table 4, the defined properties for the service are "name" and "version." Other properties are listed under the <properties> tag. The requested granularity, described above, defines the selection of properties returned. It should be noted that the object id returned in the discovery reply can be different from the object id sent in the request. Since the session id can be utilized to identify which request the reply corresponds to, the object ids do not need to match. Hence, different object ids can be used to indicate a redirection has occurred on the server for the previous reply. Table 5 below illustrates the reply for a service directory discovery request.

TABLE 5

```
<discover type = "directory" object = "directory id or query">
    <directory id = "unique identifier of service directory">
        <name = "service name"/>
        <properties>
            <key = "property name/key" value = "property value"/>
            <!-- more key/value pairs can follow -->
        </properties>
        <services>
            <!-- <service> tag series as defined in service discovery -->
        </services>
        <directories>
            <!-- <directory> tag series as defined herein -->
        </directories>
    </directory>
</discover>
```

Figure 5:
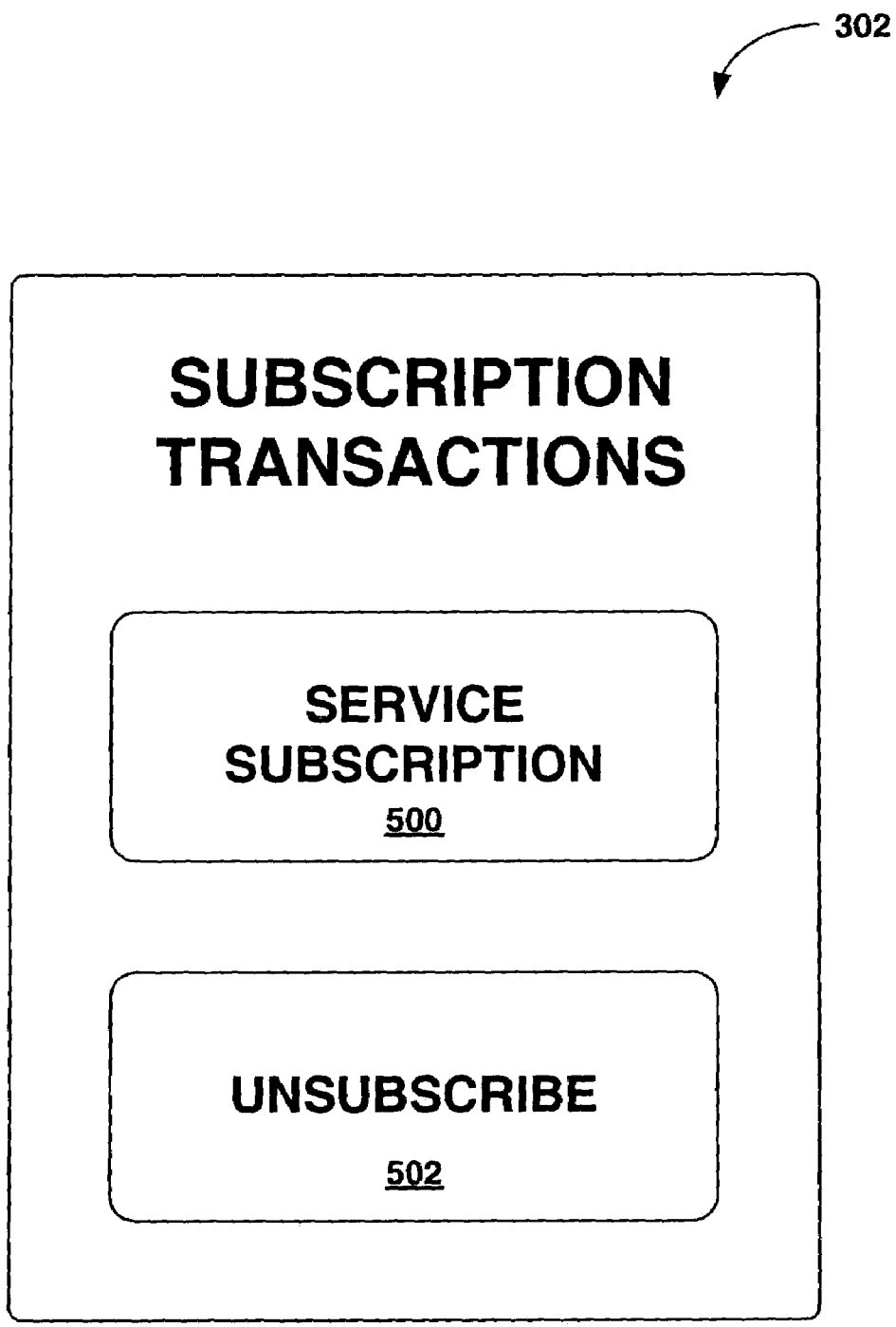
FIG. 5 is a block diagram showing exemplary subscription transactions, in accordance with an embodiment of the present invention.

FIG. 5 is a block diagram showing exemplary subscription transactions 302, in accordance with an embodiment of the present invention. The subscription transactions 302 provide the ability to subscribe or unsubscribe particular services to or from a client device. Generally, the subscription transactions 302 are preceded by discovery transactions 300. For example, a user of a client device selects services to subscribe to, or unsubscribe from, based on the discovery reply. To provide subscription functionality, embodiments of the present invention provide two subscription transactions, namely, a service subscription transaction 500 and an unsubscribe transaction 502.

The service subscription transaction 500 facilitates service subscription requests. In use, a client device makes a call to the provisioning server requesting that one or more services be added to an identified service directory. In reply, the provisioning server adds the service or services to the identified service directory and returns a success or failure of the subscription operation to the requesting client device. In general, the request to subscribe includes a client device reference to the client device whose subscription will be modified, and a list of services that are to be added to the client device subscription.

The unsubscribe transaction 502 facilitates service unsubscribe requests. In use, a client device makes a call to the provisioning server requesting that one or more services be removed from an identified service directory. In reply, the provisioning server removes the service or services from the identified service directory and returns a success or failure of the unsubscribe operation to the requesting client device. In general, the request to unsubscribe includes a client device reference to the client device whose subscription will be modified, and a list of services that are to be removed from the client device subscription. Table 6 below illustrates an exemplary subscription request and an exemplary unsubscribe request.

TABLE 6

```
<subscribe>
   <services>
      <service id = "a service id"/>
      <service id = "a service id"/>
      <!--additional service ids can follow -->
   </services>
<subscribe>
<unsubscribe>
   <services>
      <service id = "a service id"/>
      <service id = "a service id"/>
      <!--additional service ids can follow -->
   </services>
<unsubscribe>
```

Figure 6:
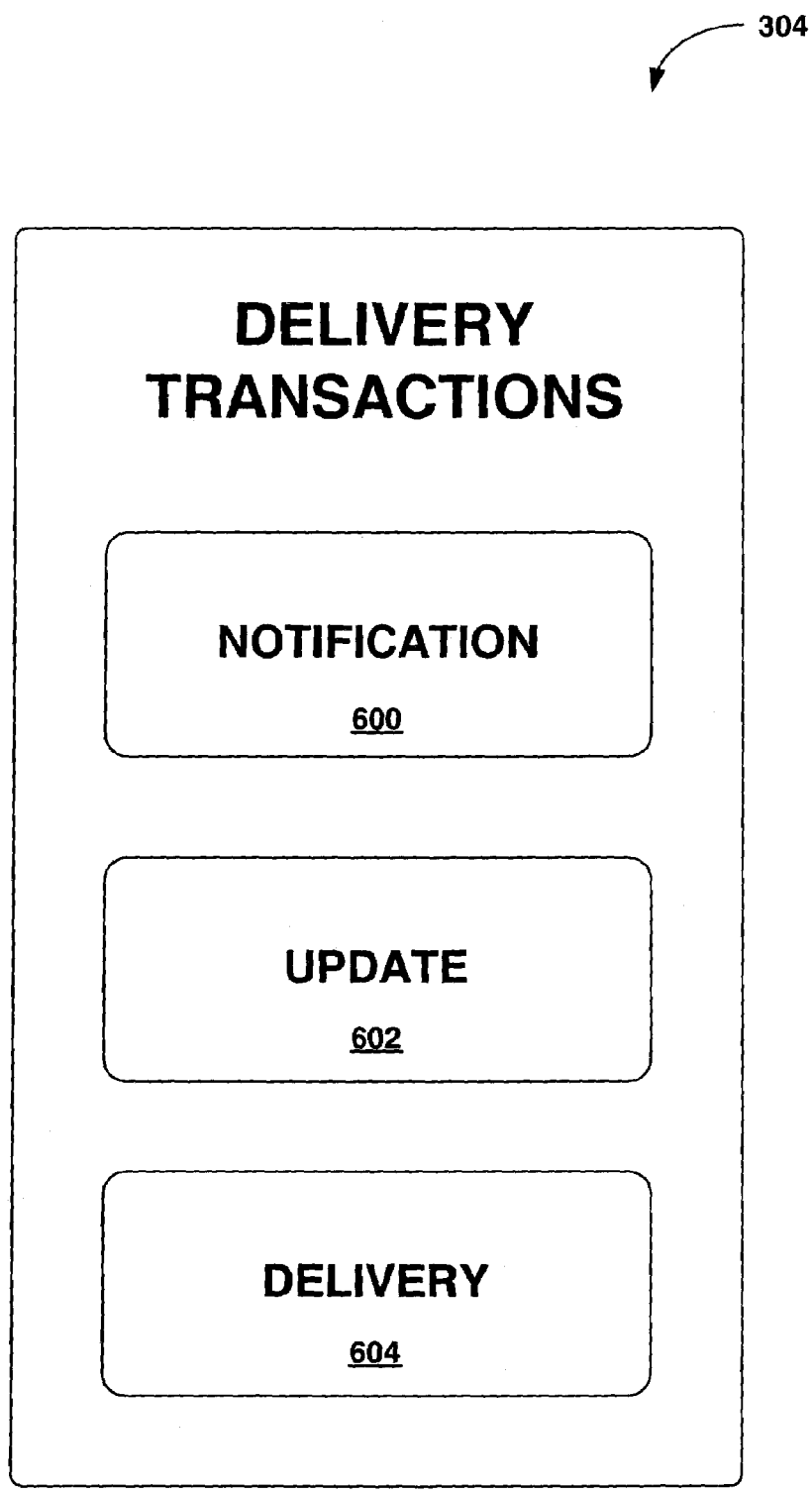
FIG. 6 is a block diagram showing exemplary delivery transactions, in accordance with an embodiment of the present invention.

FIG. 6 is a block diagram showing exemplary delivery transactions 304, in accordance with an embodiment of the present invention. The delivery transactions 304 generally provide the capabilities of downloading bundles and calculating a provisioning update for a client device. As will be described in greater detail below, a provisioning update is a list of services that a client device should have installed. To provide this functionality, embodiments of the present invention provide three delivery transactions, namely, a notification transaction 600, an update transaction 602, and a delivery transaction 604.

The notification transaction 600 is utilized by the provisioning server to initiate a provisioning cycle. More particularly, the notification transaction 600 allows the provisioning server to send a notification to a client device. The notification causes the client device to execute an update transaction 602. In response, the client device may ignore the notification, or proceed by executing the update transaction 602.

The update transaction 602 is utilized to calculate the provisioning update for a client device. As mentioned above, a provisioning update is a list of services that a client device should have installed. The provisioning server calculates the provisioning update using the subscribed and deployed special service directories for the corresponding client device.

An update request can be as follows: <update/>. However, in certain cases the client-server implementation may implement synchronization. For example, synchronization may be required when the client device view of the delivered services differs with the provisioning server's view of the delivered services. Thus, a synchronization id is utilized to verify both the client device and provisioning server are in sync. For example, the synchronization id may carry the id of an update session that the client device has committed. In one embodiment, the client device provides a list of delivered services to the provisioning server. In this manner, the provisioning server can examine the list and update the provisioning server's database accordingly. By reporting the empty state, a client device may force the provisioning server to report the complete set of services that may be installed on the client device. When a synchronization id is not utilized the client device can report its state every time the client device makes an update request. Table 7 below illustrates an update request when the synchronization id is not utilized.

TABLE 7

```
<update synchronization = "synchronization key">
   <!-- List of services client device possesses,
   if reporting currently delivered -->
   <services>
      <service id = "a service id"/>
      <service id = "a service id"/>
      <!--additional service ids can follow -->
   </services>
</update>
```

In case synchronization is being used, the status code returned by the provisioning server can contain a special value that indicates the client device should re-transmit the client device's list of services to complete the request update. Table 8 below illustrates an exemplary update reply when the synchronization is satisfied or not used.

TABLE 8

```
<update>
   <install>
      <services>
         <service id = "a service id to install">
            <bundle location = "bundle location to install"/>
            <bundle location = "bundle location to install"/>
         </service>
         <service id = "a service id to install">
            <bundle location = "bundle location to install"/>
         </service>
         <!--additional service ids and bundle locations can follow -->
      </services>
   </install>
   <uninstall>
      <services>
         <service id = "a service id to uninstall">
         <service id = "a service id to uninstall">
         <!--additional service ids to uninstall can follow -->
      </services>
   </uninstall>
</update>
```

The delivery transaction 604 is utilized to download bundles to the client device. In use, the client device requests a particular bundle using a bundle identifier obtained using the update transaction 602. Optionally, the bundle identifier can be obtained using a discovery transaction, depending on the particular implementation. In reply, the provisioning server provides the requested bundle to the client device.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer readable medium in which a provisioning application is stored, the provisioning application including program instructions which when read by a computer system, cause the computer system to perform a method for provisioning services between a client and a provisioning server, comprising the operations of:

providing discovery transactions that allow the client device to retrieve information regarding services available to the client device from a provisioning server, wherein a service comprises a plurality of content files capable of being installed on the client device, wherein the client device is configured to restrict granularity of services requested from the provisioning server, the granularity defined by selection of one or more properties of provisioning services the client device requests to discover;

affording subscription transactions that allow the client device to manage content in service directories, wherein a service directory comprises a plurality of services; and providing delivery transactions that allow the client device to download data related to services based on synchronization of the client device with the provisioning server, wherein the synchronization ensures that view of delivered services on the client is in synchronization with the view of the delivered services on the provisioning server, wherein the discovery transactions, the subscription transactions and the delivery transactions may be requested by another client device different from the client device.

2. The computer readable medium as recited in claim 1, wherein the discovery transactions includes a service discovery transaction that allows the client device to obtain information regarding a particular service.

3. The computer readable medium as recited in claim 2, wherein the discovery transactions include a service directory discovery transaction that allows the client device to obtain information regarding a particular service directory.

4. The computer readable medium as recited in claim 1, wherein the subscription transactions include a service subscription transaction that allows a service to be added to a service directory.

5. The computer readable medium as recited in claim 4, wherein the subscription transactions include an unsubscribe transaction that allows a service to be removed from a service directory.

6. The computer readable medium as recited in claim 1, wherein the delivery transactions include an update transaction that allows the client device to obtain a provisioning update comprising a list of services that should be installed on the client device.

7. The computer readable medium as recited in claim 6, wherein the delivery transactions include a notification transaction that allows the provisioning server to request the client device to perform an update transaction.

8. The computer readable medium as recited in claim 7, wherein the delivery transactions include a delivery transaction that allows the client device to download data related to a service.

9. A method for provisioning services between a client device and a provisioning server, comprising the operations of:

providing discovery transactions that allow the client device to retrieve information regarding services available to the client device from a provisioning server, wherein a service comprises a plurality of content files capable of being installed on the client devices, wherein the client device is configured to restrict granularity of services requested from the provisioning server, the granularity defined by selection of one or more properties of provisioning services the client device requests to discover;

affording subscription transactions that allow the client device to manage content in service directories, wherein a service directory comprises a plurality of services; and providing delivery transactions that allow the client device to downloading of data related to services based on synchronization of the client device with the provisioning server, wherein the synchronization ensures that view of delivered services on the client is in synchronization with the view of the delivered services on the provisioning server, wherein the discovery transactions, the subscription transactions and the delivery transactions may be requested by another client device different from the client device.

10. The method as recited in claim 9, wherein the discovery transactions includes a service discovery transaction that allows the client device to obtain information regarding a particular service.

11. The method as recited in claim 10, wherein the discovery transactions include a service directory discovery transaction that allows the client device to obtain information regarding a particular service directory.

12. The method as recited in claim 9, wherein the subscription transactions include a service subscription transaction that allows a service to be added to a service directory.

13. The method as recited in claim 12, wherein the subscription transactions include an unsubscribe transaction that allows a service to be removed from a service directory.

14. The method as recited in claim 9, wherein the delivery transactions include an update transaction that allows the client device to obtain a provisioning update comprising a list of services that should be installed on the client device.

15. The method as recited in claim 14, wherein the delivery transactions include a notification transaction that allows the provisioning server to request the client device to perform an update transaction.

16. The method as recited in claim 15, wherein the delivery transactions include a delivery transaction that allows the client device to download data related to a service.

17. A system for provisioning services, comprising: a provisioning server; and a client device in communication with the provisioning server via a provisioning protocol, the provisioning protocol comprising:

discovery transactions that allow the client device to retrieve information regarding services available to the client device from a provisioning server, wherein a service comprises a plurality of content files capable of being installed on the client device, wherein the client device is configured to restrict granularity of services requested from the provisioning server, the granularity defined by selection of one or more properties of provisioning services the client device requests to discover;

subscription transactions that allow the client device to manage content in service directories, wherein a service directory comprises a plurality of services; and delivery transactions that allow the client device to download data related to services based on synchronization of the client device with the provisioning server, wherein the synchronization ensures that view of delivered services on the client are in synchronization with the view of the delivered services on the provisioning server, wherein the discovery transactions, the subscription transactions and the delivery transactions may be requested by another client device different from the client device.

18. The system as recited in claim 17, wherein the discovery transactions include a service discovery transaction that allows the client device to obtain information regarding a particular service, and wherein the discovery transactions further include a service directory discovery transaction that allows the client device to obtain information regarding a particular service directory.

19. The system as recited in claim 17, wherein the subscription transactions include a service subscription transaction that allows a service to be added to a service directory, and wherein the subscription transactions further include an unsubscribe transaction that allows a service to be removed from a service directory.

20. The system as recited in claim 17, wherein the delivery transactions include an update transaction that allows the client device to obtain a provisioning update comprising a list of services that should be installed on the client device, the delivery transactions further including a notification transaction that allows the provisioning server to request the client device to perform an update transaction, and wherein the delivery transactions further include a delivery transaction that allows the client device to download data related to a service.

* * * * *